(12) United States Patent
Regenor et al.

(10) Patent No.: US 12,190,312 B2
(45) Date of Patent: Jan. 7, 2025

(54) DATA ASSURANCE SOLUTION USING VERIFIABLE CREDENTIALS AND BLOCKCHAIN

(71) Applicant: VeriTX Corp., Buffalo, NY (US)

(72) Inventors: James Allen Regenor, East Aurora, NY (US); Timothy D. Abbott, East Aurora, NY (US)

(73) Assignee: VeriTX Corp., Buffalo, NY (US)

( * ) Notice: Subject to any disclaimer, the term of this patent is extended or adjusted under 35 U.S.C. 154(b) by 372 days.

(21) Appl. No.: 17/862,813

(22) Filed: Jul. 12, 2022

(65) Prior Publication Data
US 2024/0020679 A1    Jan. 18, 2024

(51) Int. Cl.
| | | |
|---|---|---|
| G06F 21/00 | (2013.01) | |
| G06F 21/10 | (2013.01) | |
| G06F 21/64 | (2013.01) | |
| G06Q 20/36 | (2012.01) | |
| G06Q 20/40 | (2012.01) | |

(52) U.S. Cl.
CPC ......... *G06Q 20/367* (2013.01); *G06F 21/108* (2023.08); *G06F 21/64* (2013.01); *G06Q 20/401* (2013.01); *G06Q 2220/00* (2013.01)

(58) Field of Classification Search
CPC .............. G06Q 20/367; G06Q 20/401; G06Q 2220/00; G06Q 30/018; G06F 21/108; G06F 21/64; H04L 9/0861; H04L 9/50
See application file for complete search history.

(56) References Cited

U.S. PATENT DOCUMENTS

| | | | | |
|---|---|---|---|---|
| 11,063,864 | B2* | 7/2021 | Munson | H04L 9/3247 |
| 2021/0273812 | A1* | 9/2021 | Hardin | H04L 9/0637 |
| 2021/0398093 | A1* | 12/2021 | Lynch | G06Q 20/389 |
| 2022/0292543 | A1* | 9/2022 | Henderson | G06Q 30/0252 |

(Continued)

FOREIGN PATENT DOCUMENTS

| | | |
|---|---|---|
| KR | 1020200108757 | 9/2020 |
| KR | 1020210040569 | 4/2021 |

OTHER PUBLICATIONS

Jacob Eberhardt, et al., "On or Off the Blockchain? Insights on Off-Chaining Computation and Data", ResearchGate, Oct. 5, 2017, pp. 1-13 and figure 4.

(Continued)

*Primary Examiner* — Mahfuzur Rahman
(74) *Attorney, Agent, or Firm* — Woods Oviatt Gilman LLP; Katherine H. McGuire, Esq.

(57) ABSTRACT

The present invention tracks provenance (people, place, time, permissions, machine characterization and identification) for an off-chain digital asset, provides data verifiability and enforces least privileged access within a single organization or across multiple organizations via a combination of Blockchain and communication agents to enable data assured operations in a normal operating environment and Logistics Under Attack (LUA) environment. The present invention creates data assurance for a digital asset across networks and within environments as it tracks provenance of the digital asset at rest or in motion allowing a data file to move directly from the originator to a customer at the point of use or point of origin to point of use and all points in between in a prescribed or random flow.

17 Claims, 2 Drawing Sheets

(56) References Cited

U.S. PATENT DOCUMENTS

2023/0237349 A1* 7/2023 Donoho ................. G06N 5/022
  706/46
2023/0394507 A1* 12/2023 Giroti .................. G06Q 10/087
2024/0020679 A1* 1/2024 Regenor ................ G06F 21/64

OTHER PUBLICATIONS

Carlos Molina-Jimenez, et al., "Implementation of Smart Contracts Using Hybrid Architectures with On and Off-Blockchain Components", 2018 IEEE 8th International Symposium on Cloud and Service Computing (SC2), Nov. 21, 2018, pp. 83-90.

Ellis Solaiman, et al., "Implementation and evaluation of smart contracts using a hybrid on- and off-blockchain architecture", Wiley, DOI: 10.1002/cpe.5811, May 13, 2020, pp. 1-17.

* cited by examiner

DATA ASSURANCE SOLUTION USING VERIFIABLE CREDENTIALS AND BLOCKCHAIN

FIELD OF THE INVENTION

The present invention broadly relates to Blockchain technology (also referred to as distributed ledger technology), and more particularly to tracking the provenance and providing verifiability of digital assets that reside off-chain through interconnection of the digital assets characteristics to a Blockchain.

BACKGROUND OF THE INVENTION

Current decentralized systems using Blockchain technology can provide for secure, verifiable and immutable data management but can only provide those attributes to data contained on the representative Blockchain. Due to this restriction Blockchain has only been traditionally used for tracking data but has not provided an indelible link from on-chain data to off-chain digital or physical assets. Without that linkage the true ability to provide secure, verifiable and immutable digital asset management has not been possible using Blockchain technology. One aspect of the present invention provides the ability to connect off-chain digital asset(s) to a given Blockchain and enable the ability to provide the secure, immutable and verifiable management of any digital asset throughout its lifecycle across multiple organizations. Additionally, Blockchain smart contracts may be employed to define the terms and conditions of participation and for remuneration the contracts, whether or not the contract is related to the digital assets. Fungible and/or non-fungible tokens representing an asset or collection of assets may also be bought and sold on a tokenized commodities exchange leveraging smart contracts for remuneration and transaction expediency.

SUMMARY OF THE INVENTION

The present invention tracks provenance (people, place, time, permissions, machine characterization and identification) for an off-chain digital asset, provides data verifiability and enforces least privileged access within a single organization or across multiple organizations via a combination of Blockchain and communication agents to enable data assured operations in a normal operating environment and Logistics Under Attack (LUA) environment. The present invention creates data assurance for a digital asset across networks and within environments as it tracks provenance of the digital asset at rest or in motion allowing a data file to move directly from the originator to a customer at the point of use or point of origin to point of use and all points in between in a prescribed or random flow.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

The invention will further be described, by way of example, with reference to the accompanying drawings.

DETAILED DESCRIPTION

Figure 1:
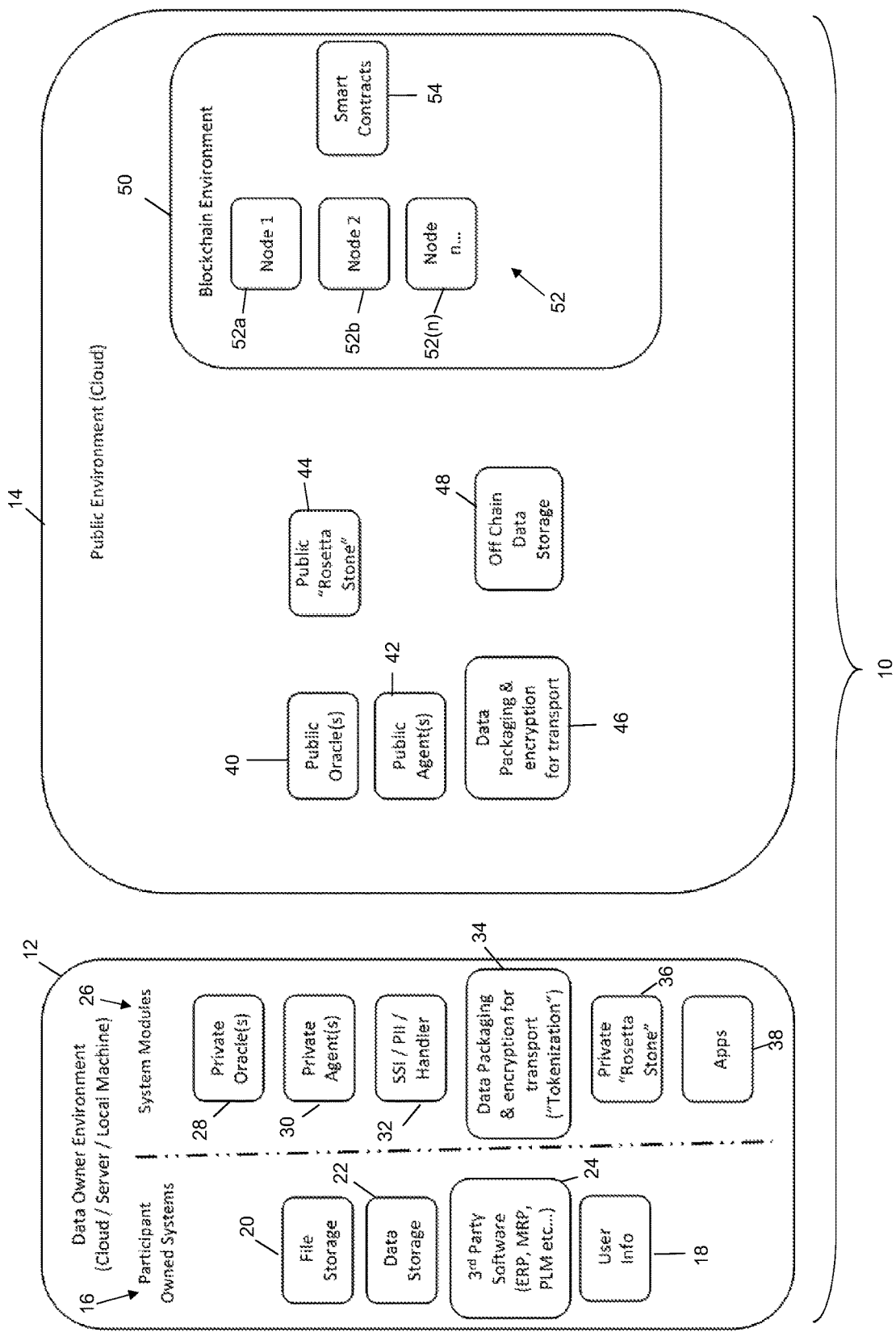
FIG. 1 is a graphic representation of an exemplary system architecture in accordance with an embodiment of the present invention.

With reference to FIG. 1, an exemplary system architecture is generally indicated as reference number 10. Architecture 10 may include a data owner environment 12 and a public environment 14. Data owner environment 12 may be tangible, i.e., in a local computing device, or may be virtual, such as over the cloud or on a remote server. Participant owned systems 16 may include various modules including user information 18 of participant (i.e., an individual or other entity); file and data storage 20, 22, respectively and any third party software 24, such as but not limited to enterprise resource planning (ERP), manufacturing resource planning (MRP) and/or product lifecycle management (PLM) software and the like.

Data owner environment 12 may also include system modules 26 which may access and communicate with participant owned systems 16 to track provenance (people, place, time, permissions, machine characterization and identification) and provide data verifiability and enforce least privileged access via a combination of Blockchain and communication agents as will be described in greater detail below. System modules 26 may include one or more private oracles 28 configured to allow the system to access and monitor the participant owned systems 16 and allow the participant owned systems 16 users to privately access the cloud through one or more private agents 30. System modules 26 may further include additional security—related functionalities, such as but not limited to SSI (Self Sovereign Identity) and PII (Personal Identifiable Information) handlers 32. Tokenization module 34 enables data packaging and encryption for digital transport/transfer, while a private "Rosetta Stone" module 36 enables obfuscation of data prior to communication and translation of the data between decentralized systems contained in the public environment 14. System modules 26 also includes an application (app) 38 which enables interaction between the owner/user and the system.

Data owner environment 12 is configured to communicate with public environment 14 such as via a decentralized system of public oracles 40 and associated public agents 42. Similar to the privacy of data owner environment 12, public environment 14 may include a public "Rosetta Stone" translator module 44 and tokenization module 46. Digital information may also be stored within off chain data storage 48, such as a decentralized server. As will be described in greater detail below, when a private agent 30 or private oracle 28 elects to initiate a transaction, public agent(s) 42 or public oracle(s) 40 that are part of the public environment 14 prompt a Blockchain environment 50 comprising a plurality of nodes 52 (e.g., 52a-52(n), as shown) to consummate any smart contracts 54 required for completion of the transaction and updating of the Blockchain ledger. Once said transaction is complete and verified to have been added to the Blockchain ledger, the completion of the transaction is read by the public oracle(s) 40 and communicated back to the data owner environment 12 to the private oracle(s) 28 to provide positive confirmation of transaction completion.

Figure 2:
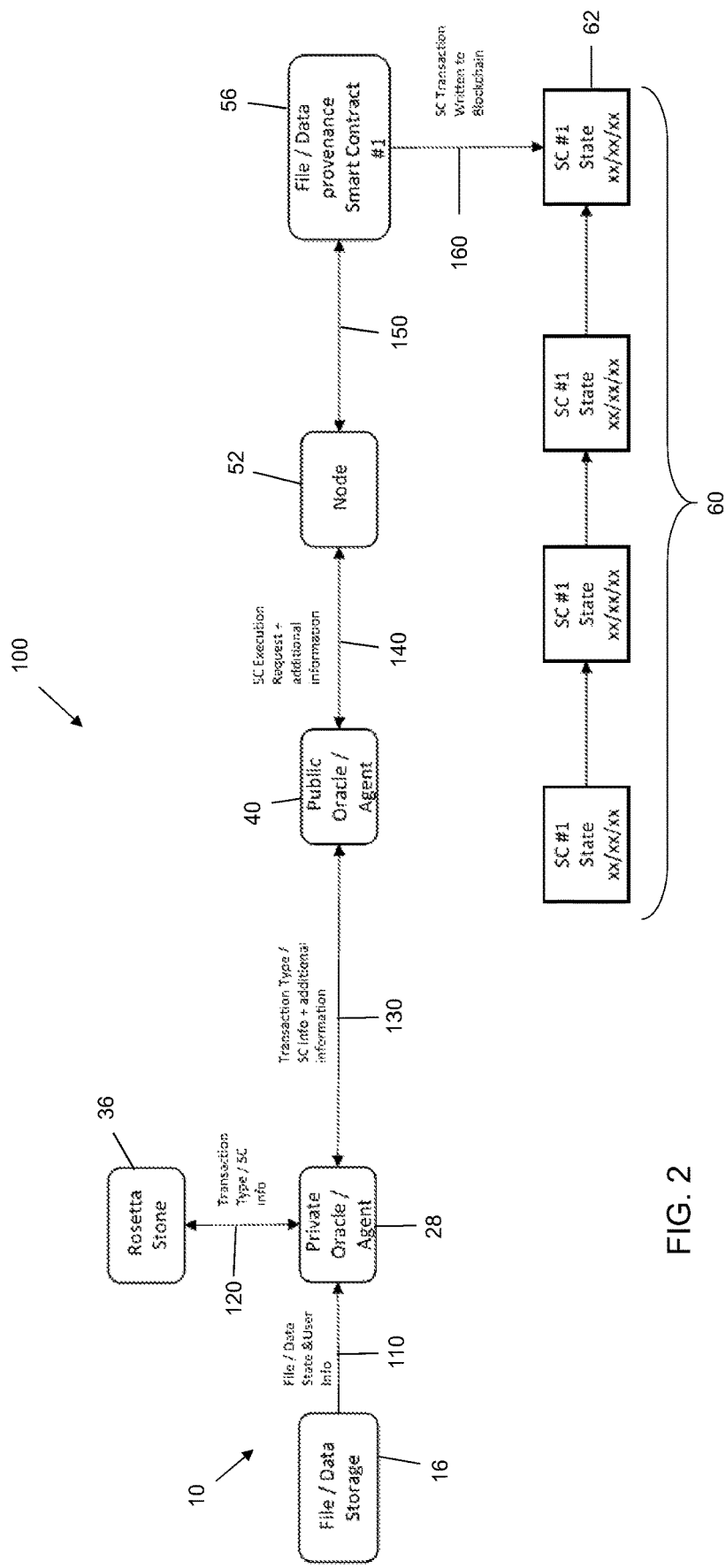
FIG. 2 is a graphic representation of an exemplary method of a smart contract transaction executed by the system architecture shown within FIG. 1.

Turning to FIG. 2, an exemplary method 100 of a smart contract transaction executed by the system architecture 10 originates with private oracle 28 monitoring and receiving file, data state and user information from participant owned systems 16 at step 110. If a state change or condition is met requiring a system action, the private oracle 28 obtains the relevant state change data and creates a cryptographic hash of the information pertinent to the state change or condition. At step 120, private oracle 28 then utilizes private "Rosetta Stone"/translation module 36 to interrogate and, if necessary, translate the information received in step 110 to identify the transaction type being initiated and any smart contract information associated with that transaction. At step 130, the transaction type, smart contract information and any other additional information is obfuscated and communicated to public oracle 40 which then issues a smart contract execution request including any additional information to the decentralized network at step 140. One or more nodes 52 then verify the validity of the request for smart contract 56 execution and if validated, pass the request and additional information from step 140 to the appropriate smart contract 56. Smart contract 56 code then takes the prescribe actions contained within its code, updates it state and logs the verified and updated file and data provenance transaction 160 into a new block 62 on the Blockchain 60. The public oracle/agent 40 monitors the status of the smart contract 56 and the transaction status 160 until the transaction is complete. Once the transaction is completed, the public oracle/agent 40, provides notification of the transaction status back to the private oracle/agent 28.

The above system and method may track the provenance (people, place, time, permissions, machine characterization and identification) and provide data verifiability while enforcing least privileged access via a combination of Blockchain and communication agents to enable data assured operations in a normal operating environment and Logistics Under Attack (LUA) environment. The above system and method may create data provenance across networks and within environments as it tracks provenance of the digital asset at rest or in motion, thereby allowing a data file to move directly from an original equipment manufacturer to a customer at the point of use or point of origin to point of use and all points in between in a prescribed or random flow.

Although the invention has been described with reference to preferred embodiments thereof, it is understood that various modifications may be made thereto without departing from the full spirit and scope of the invention as defined by the claims which follow.

What is claimed is:

1. A decentralized computing system leveraging Blockchain/distributed ledger technology for digital data assurance, the decentralized computing system comprising:
   a) one or more environments including one or more off-Blockchain and/or on-Blockchain digital data sources;
   b) one or more Blockchains capable of running smart contracts;
   c) one or more translation modules configured to provide data obfuscation via cryptographic hashes to generate obfuscated data provenance information;
   d) one or more data listening modules configured to monitor status of data contained in the one or more digital data sources and log the data's obfuscated data provenance information into a respective smart contract on a respective Blockchain;
   e) one or more Blockchain listening modules configured to provide smart contract transaction status feedback to the one or more data listening modules when an off-Blockchain to on-Blockchain transaction is requested, wherein when an on-Blockchain to off-Blockchain action request is generated a respective Blockchain listening module of the one or more Blockchain listening modules passes the request to a respective data listening module of the one or more data listening modules; and
   f) one or more API handling modules configured to facilitate interactions between system software modules, wherein the one or more translation modules provides data obfuscation prior to sending the data to the respective Blockchain via either the one or more listening modules or the one or more API handling modules.

2. The decentralized computing system of claim 1 wherein the one or more translation modules are further configured to de-obfuscate the obfuscated data provenance information for use in user readable applications.

3. The decentralized computing system of claim 1 wherein the one or more data listening modules further include prescribed actions that will execute for a given status change in the data resulting in a transaction type specific smart contract execution on the respective Blockchain.

4. The decentralized computing system of claim 1 further comprising one or more identity modules configured to provide user, software and module identity and security.

5. The decentralized computing system of claim 1 further comprising one or more packaging modules configured to package and encrypt data for transport between different data sources.

6. The decentralized computing system of claim 1 further comprising one or more data storage systems separate from the one or more digital data sources to support data transport between disparate data sources.

7. The decentralized computing system of claim 1 further comprising one or more software applications configured to provide a user interface and visualization of the digital data assurance for the related data.

8. The decentralized computing system of claim 1 wherein at least one or the digital data sources is a cloud based virtual server.

9. The decentralized computing system of claim 1 wherein at least one or the digital data sources is a hardware based server.

10. The decentralized computing system of claim 1 wherein at least one or the digital data sources is a local directory on a computer.

11. The decentralized computing system of claim 1 wherein the one or more environments comprises one or more private permissioned environments and a public environment.

12. The decentralized computing system of claim 1 wherein the one or more environments comprises one or more private permissioned environments.

13. The decentralized computing system of claim 1 wherein the one or more Blockchains are private permissioned Blockchains.

14. The decentralized computing system of claim 1 wherein the one or more Blockchains is a public Blockchain.

15. The decentralized computing system of claim 1 wherein the one or more Blockchains are a combination of public and private Blockchains.

16. A method for conducting digital data assurance using a decentralized computing system leveraging Blockchain/distributed ledger technology, the method comprising:
   a) providing the decentralized computing system comprising one or more environments including one or more off-Blockchain and/or on-Blockchain digital data sources, one or more Blockchains capable of running smart contracts, one or more translation modules, one or more data listening modules, one or more Blockchain listening modules, and one or more API handling modules;

b) monitoring, via the one or more data listening modules, the status of data contained in the one or more digital data sources;

c) providing, via the one or more Blockchain listening modules, smart contract transaction status feedback to the one or more data listening modules when an off-Blockchain to on-Blockchain transaction is requested;

d) generating, via the one or more translation modules, obfuscated data provenance information;

e) logging, via the one or more data listening modules, the data's obfuscated data provenance information into a respective smart contract on a respective Blockchain.

17. The method of claim 16 further comprising:

f) de-obfuscating, via the one or more translation modules, the obfuscated data provenance information for use in user readable applications.

* * * * *